Patented Feb. 11, 1941

2,231,659

UNITED STATES PATENT OFFICE 2,231,659

POLYMETHINE DYE INTERMEDIATES

Leslie G. S. Brooker, and Frank L. White, Rochester, N. Y., assignors to Eastman Kodak Company, Rochester, N. Y., a corporation of New Jersey No Drawing. Application April 19, 1940, Serial No. 330,580. In Great Britain May 9, 1939

14 Claims. (Cl. 260—304)

This invention relates to dye intermediates and to dyes prepared therefrom.

In United States Patent No. 2,112,139, dated March 22, 1938, the preparation of ketones of the following general formula is described:

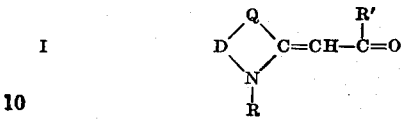

wherein D represents a phenylene or a naphthylene group, Q represents a sulfur or a selenium atom, R represents an alkyl group and R' represents an alkyl or an aryl group.

We have now found that ketones of the above general formula can be condensed, with phosphorus oxyhalides to give products, from which, we have found, polymethine dyes useful as photographic sensitizers can be prepared. One may, however, employ a lower vinylene homologue such as an N-alkyl-2-quinolone, in which case the 2-halo-quinoline alkhalides obtained may be employed as intermediates for the preparation of simple methine dyes.

It is an object of our invention, therefore, to provide new products. A further object is to provide a process for preparing such new products. A further object is to provide new dyes and process for preparing these dyes. Other objects will become apparent hereinafter.

The products obtained according to our invention by the reaction of the ketones and the phosphorus oxyhalides have the following general formulas:

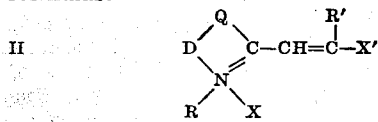

and

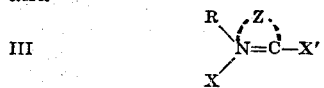

wherein D represents a phenylene or a naphthylene group, Q represents a sulfur or a selenium atom, each R represents an alkyl group such as methyl, ethyl, β-ethoxyethyl, butyl, allyl or benzyl for example, R' represents an alkyl group such as methyl, ethyl, butyl, allyl, β-ethoxyethyl or benzyl for example, or an aryl group such as phenyl, naphthyl or furyl for example, each X represents a halide anion, and each X' represents a halogen atom, and Z the non-metallic atoms necessary to complete a quinoline nucleus. The halide anion can be replaced by other anions such as perchlorate for example, so that in its broadest scope our invention embraces products wherein X represents any anion.

In accordance with our invention, we prepare the halogenovinyl compounds by treating a ketone of formula I above with a phosphorus oxyhalide, advantageously, but not necessarily, in the presence of a diluent. The reaction takes place very readily, so that in some cases, it is advantageous to chill the reaction mixture. Benzene, toluene, chloroform or carbon tetrachloride are suitable diluents in which to effect the reactions. Phosphorus oxytrichloride is advantageously employed.

The following examples will serve to illustrate the formation of these new halogeno-vinyl derivatives.

EXAMPLE I.—2-(2-chloropropenyl)-benzothiazole ethochloride

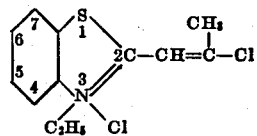

5.5 g. (1 mol.) of 2-acetylmethylene-3-ethyl-benzothiazoline were dissolved in about 100 c. c. of dry benzene. The solution was chilled to about 5° C. in an ice-water bath. To the chilled solution there were added with stirring 4.0 g. (1.5 mols.) of freshly distilled phosphorus oxychloride. A sticky product formed which became crystalline as the reaction mixture was stirred at about 5° C. The crystalline solid was filtered off and washed with approximately 50 c. c. of dry benzene, followed by 25 c. c. of dry diethyl ether. The product thus obtained was in the form of nearly colorless crystals which became somewhat reddish upon exposure to air. The yield of product was 5.6 grams.

In place of 2-acetylmethylene-3-ethyl-benzothiazoline, there may be employed an equivalent amount of 2-acethylmethylene-5-chloro-3-ethyl benzothiazoline, in which case the product is 5-chloro-2-(2-chloropropenyl)-benzothiazole ethochloride.

EXAMPLE 2.—2-bromo-6-methoxyquinoline ethobromide

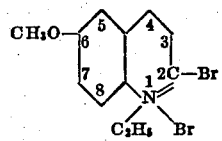

19.2 g. (1 mol.) of 1-ethyl-6-methoxy-2-quinolone were dissolved in 200 c.c. of dry benzene and the solution chilled in an ice-water bath. To this solution was gradually added with stirring 40.7 g. (1.5 mols.) of phosphorus oxybromide dissolved in 100 c.c. of dry benzene. A thick yellow mass formed on the walls and bottom of the container. After about 15 minutes, the benzene solution was decanted and the sticky residue stirred with a fresh portion of dry benzene (50 c.c.). The benzene treatment was repated twice more, after which the still sticky residue was stirred with 25 c.c. of warm acetone. On chilling the solution, the product precipitated in the form of colorless crystals which were collected on a filter and washed with acetone. The yield was 81% of theory.

If 9.0 grams of the above 2-bromo-6-methoxyquinoline ethobromide is treated in a hot methyl alcoholic solution of 5.82 g. (1.5 mols.) of sodium iodide, there is obtained from the chilled solution a yield of 71% of theoretical of 2-bromo-6-methoxyquinoline ethiodide.

EXAMPLE 3—2-(2-bromopropenyl)-benzoselenazole ethobromide

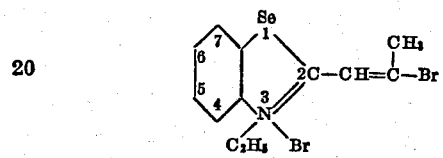

7.17 g. (1.25 mols.) of phosphorus oxybromide were added slowly with stirring to a suspension of 5.32 g. (1 mol.) of 2-acetylmethylene-3-ethylbenzoselenazoline in 50 c.c. of dry benzene. The product of reaction separated as a sticky mass. After chilling and further stirring, the mass became crystalline, and was filtered off and washed with dry benzene. The dull yellow compound thus obtained was dried in a vacuum desiccator over potassium hydroxide and paraffin wax. The yield of product was 7.9 grams.

EXAMPLE 4.—2-(2-bromopropenyl)-naphtho [1,2] thiazole ethobromide

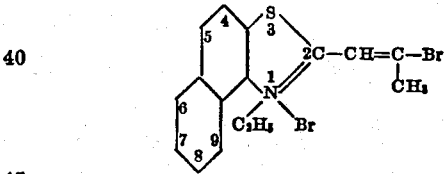

7.17 g. (1.25 mols.) of phosphorus oxybromide were added slowly with stirring to a suspension of 5.38 g. (1 mol.) of 2-acetylmethylene-1-ethyl-naphtho [1,2] thiazoline in 30 c.c. of dry benzene. After chilling the reaction mixture, the yellow crystals were collected on a filter and washed with dry benzene. The product was dried in a vacuum desiccator over powdered potassium hydroxide and paraffin wax, the yield being about 7.5 grams.

In a manner generally similar to that above described, there may be prepared closely related compounds such, as for example, 2-(2-chloropropenyl)-naphtho [2,1] thiazole ethochloride from 2 - acetylmethylene - 3 - methyl - naphtho [2,1] thiazoline and phosphorus oxychloride, 2-(2-chloro-Δ¹-butenyl) naphtho [1,2] thiazole ethochloride from 2-propionylmethylene-1-ethyl-naphtho [1,2] thiazoline and phosphorus oxychloride, and 2 - (2 - chloropropenyl) - naphtho [1,2] thiazole ethochloride from 2-acetylmethylene-1-ethyl-naphtho [1,2] thiazoline and phosphorus oxychloride.

We have found that our new halogenovinyl compounds can be condensed with cyclammonium quaternary salts containing a reactive methyl group, with themselves to give dicarbocyanine dyes which in turn can be condensed with amines, with primary and secondary amines, and with compounds containing a reactive methylene such as rhodanine, a 2-thiohydantoin or a 2-thio-2,4 (3,5)-oxazoledione.

The following examples illustrate condensations of the type above described.

EXAMPLE 5.—5-[(5-chloro-3-ethyl-2(3)-benzothiazolylidene)-isopropylidene]-3-ethylrhodanine

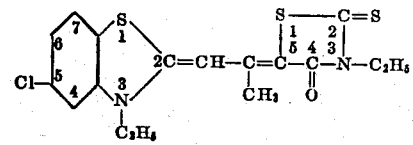

1.54 g. (1 mol.) of 5-chloro-2-(2-chloropropenyl)-benzothiazole ethochloride and 1.00 g. (1.25 mols.) of 3-ethylrhodanine were dissolved in 15 c.c. of absolute ethyl alcohol. To this solution was added 1.06 g. (2.1 mols.) of triethylamine and the reaction mixture was heated at the refluxing temperature for about two minutes. Reddish crystals of dye separated very rapidly. The cooled reaction mixture was then stirred with 100 c.c. of ethyl ether and the whole chilled at 0° C. The crude dye obtained was washed on the filter with methyl alcohol. The yield of dye was 28% crude and 17% after two recrystallizations from acetic acid (125 c.c. per gram of dye). The dull red crystals had a green reflex and melted at 250–251° C. with decomposition. The dye sensitized a silver bromide emulsion to 670 mµ with maximum at 520 and 580 mµ.

In place of 3-ethylrhodanine, there may be substituted 3-ethyl-2-thio-2,4(3,5) - oxazoledione to give the dye product 5-[(5-chloro-3-ethyl-2(3) - benzothiazolylidene) - isopropylidene] - 3 - ethyl-2-thio-2,4(3,5)-oxazoledione in the form of orange crystals having a melting point at 264–265° C. with decomposition. The dye sensitizes a photographic silver bromide emulsion to 610 mµ with a maximum sensitivity at about 550 mµ.

EXAMPLE 6.—9-chloro-3,3'-diethyl - 11 - methyl-thiadicarbocyanine chloride

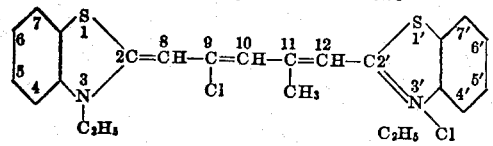

To 1.10 g. (2 mols.) of 2-acetylmethylene-3-ethyl-benzothiazoline in 10 c. c. of diethylaniline was added with stirring 0.80 g. (1.04 mol.) of freshly distilled phosphorus oxychloride. Dye formation was rapid and green crystals separated from the deep blue reaction mixture. The reaction mixture was stirred for about 5 minutes, and 10 minutes later, it was treated with ethyl ether (75 c. c.) to completely precipitate the dye. After collecting the dye on the filter, it was washed with ethyl ether and then with acetone. The yield of green crystals was 70%. The methyl alcoholic solution was blue. Since this dye was not very stable, it was used at once for the preparation of Example 7.

EXAMPLE 7.—3,3'-diethyl-9 - (1 - piperidyl) - 11 - methyl-thiadicarbocyanine iodide

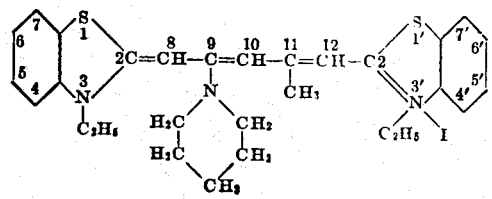

0.80 g. (167% excess) of piperidine were dissolved in 5 c. c. of absolute ethyl alcohol. This solution was added to 1.0 g. (1 mol.) of 9-chloro-3,3'-diethyl-11-methyl-thiadicarbocyanine chloride with stirring at room temperature. The hot reaction mixture was then treated with a hot solution of potassium iodide (2 g. in 15 c. c. of water). After chilling the mixture for several hours at 0° C., the dye was collected on a filter and washed with water. The residue was stirred with hot acetone in a beaker. The resulting solution was then chilled at 0° C., and the dye which formed was collected on a filter and washed with a little cold acetone. The yield of dye was 32% crude and 12% after two recrystallizations from methyl alcohol (175 c. c. per gram of dye). The greenish bronze crystals melted at 217–218° C. with decomposition. The dye sensitized a photographic silver bromide emulsion to 690 mμ with a maximum sensitivity at 640 mμ. It is a weak sensitizer.

EXAMPLE 8.—2 - (2 - anilinopropenyl) - naphtho-[1,2] thiazo ethiodide

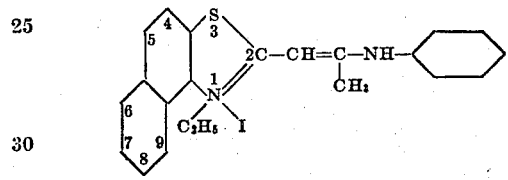

To 16.2 g. (1 mol.) of 2-2-(2-chloropropenyl)-naphtho [1,2] thiazole ethochloride dissolved in 5 c. c. of absolute ethyl alcohol was added 0.93 g. (2 mols.) of aniline. The reaction mixture was allowed to stand at room temperature for a period of about 2 hours. The product was converted to the iodide by treating the warmed reaction mixture with 10 c. c. of an aqueous solution of 2 grams of potassium iodide. The crystals which formed from the chilled mixture were collected on a filter and washed with water. The residue was stirred in a beaker with acetone, the suspension chilled, and the crystals filtered off and washed with acetone. The yield of product was 60% crude and 19% after two recrystallizations from 95% ethyl alcohol (65 c. c. per gram of dye). The dull yellow crystals melted at 238–239° C. with decomposition. The dye sensitized a photographic silver chloride emulsion to 500 mμ with a maximum sensitivity at 470 mμ.

EXAMPLE 9.—[(5-chloro-3-ethyl-2(3) - benzothiazolylidene)-isopropylidene] benzoylacetonitrile

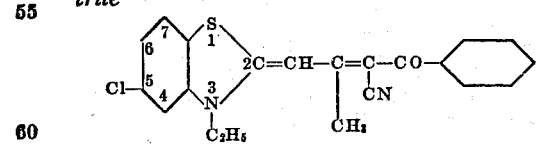

1.54 g. (1 mol.) of 5-chloro-2-(2-chloropropenyl)-benzothiazole ethochloride and 0.91 g. (1.25 mols.) of benzoylacetonitrile were dissolved in 10 c. c. of absolute ethyl alcohol. To this solution was added 1.06 g. (2.1 mols.) of triethylamine and the reaction mixture heated at the refluxing temperature for about 2 minutes. Dye formation was rapid and orange crystals separated from the cooled reaction mixture, which yielded a further portion of dye when it was treated with about 100 c. c. of ethyl ether. The crude dye was collected on the filter and washed with cold methyl alcohol. The yield of dye was 37% crude and 16% after two recrystallizations, the first from acetic acid, and the second from 95% ethyl alcohol (130 c. c. per gram of dye). The orange crystals melted at 199–200° C. with decomposition. The dye sensitized a photographic silver bromide emulsion to 550 mμ with maximum sensitivity at about 500 mμ.

EXAMPLE 10.—2-[2-(1-piperidyl) propenyl]-naphtho [1,2] thiazole eth oxide

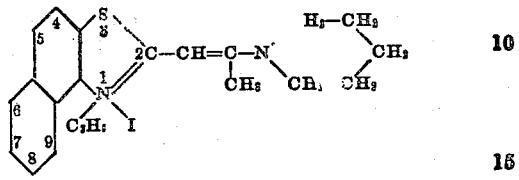

To 1.62 g. (1 mol.) of 2-(2-chloropropenyl)-naphtho [1, 2] thiazole ethochloride dissolved in 5 c. c. of absolute ethyl alcohol was added 0.85 g. (2 mols.) of piperidine. The reaction mixture was allowed to stand with occasional shaking at room temperature for a period of about 2 hours. The product was then converted to the iodide by treating the warmed reaction mixture with a hot solution of potassium iodide (2 g. in 10 c. c. of water). The crystals which formed from the chilled mixture were collected on a filter and washed with water. The residue was stirred in a beaker with acetone (15 c. c.) and after chilling the suspension, the buff colored crystals were washed on the filter with acetone. The yield of new product was 62% crude and 28% after two recrystallizations from 95% ethyl alcohol (10 c. c. per gram of dye). The dull greenish yellow crystals melted at 169–170° C. with decomposition. The dye sensitized a photographic silver chloride emulsion to 450 mμ with a maximum at 425 mμ.

If the piperidine is substituted by an equivalent amount of morpholine, there is obtained the corresponding dye compound 2-[2-(4-morpholyl)-propenyl]-naphtho[1, 2] thiazole ethiodide. The yield of new product was 69% crude and 19% after two recrystallizations from 95% ethyl alcohol, including a treatment with decolorizing charcoal during the first recrystallization. The brownish yellow crystals melted at 241–242° C. with decomposition. The dye sensitized a photographic silver chloride emulsion to 450 mμ with a maximum sensitivity at 430 mμ.

EXAMPLE 11.—5-[(1-ethyl-2(1)-naphtho [1,2] thiazolylidene) isopropylidene]-2-thio-2,4,6-triketohexahydropyrimidine

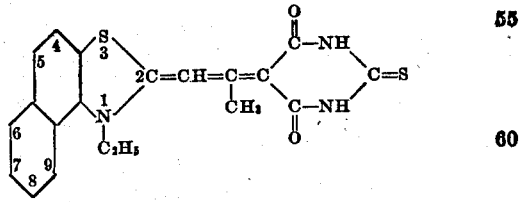

To 0.81 g. (1 mol.) of 2-(2-chloropropenyl)-naphtho [1,2]-thiazole ethochloride and 0.36 g. (1 mol.) of thiobarbituric acid suspended in 15 c. c. of absolute ethyl alcohol was added with shaking 0.53 g. (2.1 mols.) of triethylamine. The reaction mixture was heated at the refluxing temperature for about two minutes. Dye formation was rapid. The dye was further precipitated by the addition of ethyl ether (100 c. c.). After chilling the mixture, the product was collected on a filter and washed with methyl alcohol. The yield of dye was 25% crude and 3% after two recrystallizations from pyridine (70 c. c. per gram of dye). The dull reddish crystals with blue reflux melted at 298–300° C. with decomposition. The dye sensitized a photographic silver chloride emulsion to 465 mμ with a maximum sensitivity at about 430 mμ.

EXAMPLE 12.—*1′,3-diethyl-6′-methoxythia-2′-cyanine iodide*

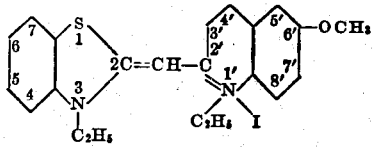

The suspension of 1.97 g. (1 mol.) of 2-bromo-6-methoxy-quinoline ethiodide and 1.68 g. (1 mol.) of 2-methyl-benzothiazole etho-p-toluene sulfonate in 15 c. c. of absolute ethyl alcohol was heated to the refluxing temperature and 1.06 g. (2.1 mols.) of triethylamine added with shaking. Dye formation was rapid and orange crystals soon separated from solution. After a period of refluxing for about 20 minutes and while still hot, there was added to the reaction mixture 2.0 g. of potassium iodide dissolved in 10 c. c. of water. The mixture was then chilled, and the dye collected on a filter, washed with warm water, treated with 25 c. c. hot acetone, and the suspension obtained chilled at 0° C. The dye which formed was collected on a filter and washed with acetone. The yield of dye was 70% crude and 60% after one recrystallization from methyl alcohol (245 c. c. per gram of dye). The orange crystals melted at 288–289° C. with decomposition, and sensitized a photographic silver bromide emulsion to 580 mμ with a maximum sensitivity at 530 mμ. In place of triethylamine in the foregoing process, there may be substituted finely ground potassium carbonate, the yield in this case being 76% crude and 65% after one recrystallization from methyl alcohol.

EXAMPLE 13.—*1′,3-diethyl-9-methyl-4,5-benzothia-2′-carbocyanine iodide*

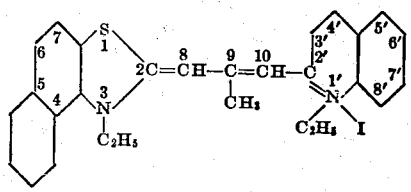

A mixture of 1.38 g. (1 mol.) of 2-(bromopropenyl)-naphtho [1,2] thiazole ethobromide and 1.14 g. (1 mol.) of quinaldine etho-p-toluene sulfonate were suspended in 15 c. c. of absolute ethyl alcohol and 0.68 g. (2 mols.) of triethylamine added with shaking. The deep blue solution obtained was heated under reflux for a period of about 10 minutes, after which time the mixture was cooled and then stirred with 150 c. c. of ethyl ether. After chilling several hours at 0° C., the ether-alcohol layer was decanted, the residue stirred with cold water and filtered off. The sticky residue thus obtained was dissolved in 10 c. c. of hot methyl alcohol and treated with one gram of potassium iodide dissolved in 15 c. c. of hot water. This mixture was chilled to about 5° C., the aqueous layer decanted, and the residue washed first with cold water, and then stirred with hot acetone. After chilling the suspension thus obtained, the dye was collected on a filter and washed with cold acetone. The dye obtained in the form of dark green crystals by recrystallization from methyl alcohol had a melting point at 242–244° C. with decomposition, and showed in an alcoholic solution a maximum absorption at about 611 mμ.

EXAMPLE 14.—*1′,3,9-triethyl-4,5-benzothia-4′-carbocyanine iodide*

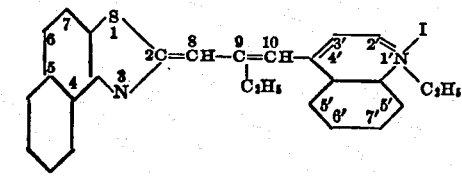

To 1.69 g. (1 mol.) of 2-(2-chloro-Δ¹-butenyl)-naphtho [1,2] thiazole ethochloride and 2.25 g. (1.5 mols.) of lepidine ethiodide suspended in 10 c. c. of absolute ethyl alcohol there was added with stirring 1.06 g. (2.1 mols.) of triethylamine. Dye formation was rapid. The reaction mixture was warmed gently for about two minutes. The dye was further precipitated by the addition of ethyl ether (75 c. c.) and the mixture chilled several hours at 0° C. The product was filtered off, washed with water, stirred in a beaker with 20 c. c. of hot acetone, and after chilling the suspension thus obtained, the crystals were collected on a filter and washed with acetone. The yield of dye was 16% crude and 5% after two recrystallizations from methyl alcohol (120 c. c. per gram of dye). The dull purplish crystals with coppery reflex melted at 209–210° C. with decomposition.

In place of 2-(2-chloro-Δ¹-butenyl)-naphtho [1,2] thiazole ethochloride, there may be substituted in the above example an equivalent amount of 2-(2-chloropropenyl)-naphtho [1,2] thiazole ethochloride to give the dye 1′,3-diethyl-9-methyl-4,5-benzothia-4′-carbocyanine iodide in the form of dark blue crystals having a melting point at 207–208° C. with decomposition, and sensitizing a photographic silver bromide emulsion weakly.

EXAMPLE 15.—*1-(2-benzothiazolyl)-4-[(1-ethyl-2(1)-naphtho [1,2] thiazolylidene) isopropylidene]-3-methyl-5-pyrazolone*

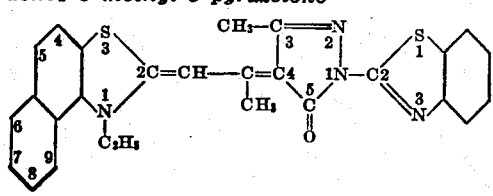

To 1.62 g. (1 mol.) of 2-(2-chloropropenyl)-naphtho [1,2] thiazole ethochloride and 1.15 g. (1 mol.) of 1-(2-benzothiazolyl)-3-methyl-5-pyrazolone suspended in 15 c. c. of absolute ethyl alcohol there was added with shaking 1.06 g. (2.1 mols.) of triethylamine. The reaction mixture was heated at the refluxing temperature for about two minutes. Dye formation was rapid. The dye was further precipitated by the addition of 100 c. c. of ethyl ether to the cooled mixture. After further chilling, the solid was collected on a filter and washed with methyl alcohol. The yield of dye was 58% crude and 8% after two recrystallizations from glacial acetic acid (1.65 c. c. per gram of dye). The orange yellow crystals melted at 292–293° C. with decomposition. The dye sensitized a photographic silver bromide emulsion to 560 mμ with a maximum sensitivity at 520 mμ.

In a manner generally similar to the above described process, there may be prepared the closely related compound 4-[(1-ethyl-2(1)-naphtho

[1,2] thiazolylidene) isopropylidene]-3-methyl-1-phenyl-5-pyrazolone from 2-(2-chloropropenyl)-naphtho [1,2] thiazole ethochloride and 3-methyl-1-phenyl-5-pyrazolone. The product is obtained in the form of red crystals having a melting point 235-236° C. with decomposition, and sensitizing a photographic silver bromide emulsion to 580 mµ with a maximum sensitivity at about 480 mµ and 530 mµ.

EXAMPLE 16.—3,3'diethyl-9-methyl-4',5'-benzoselenathiacarbocyaine iodide

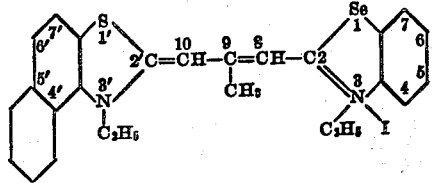

To 1.08 g. (1 mol.) of 2-(2-chloropropenyl)-naphtho [1,2] thiazole ethochloride and 1.76 g. (1.5 mols.) of 2-methylbenzoselenazole ethiodide suspended in 10 c. c. of absolute ethyl alcohol there was added with stirring 0.70 g. (2.1 mols.) of triethylamine. Dye formation was rapid. The reaction mixture was warmed gently for about two minutes. The dye was further precipitated by the addition of 75 c. c. of ethyl ether. After filtering, the product was washed with water, the residue stirred with 20 c. c. of hot acetone, the resulting suspension chilled, and the crystals filtered off and washed with acetone. The yield of dye was 43% crude and 15% after two recrystallizations from methyl alcohol (420 c. c. per gram of dye). The coppery crystals melted at 247-248° C. with decomposition. The dye sensitized a photographic silver bromide emulsion to 690 mµ with a maximum sensitivity at 550 mµ and 610 mµ.

In place of 2-methylbenzoselenazole ethiodide, there may be employed in the above example an equivalent amount of 2-methylbenzothiazole ethiodide to give the dye compound 3,3'-diethyl-9-methyl-4,5-benzothiacarbocyanine iodide. The reddish coppery crystals had a melting point at 240-241° C. with decomposition and sensitized a photographic silver bromide emulsion to 680 mµ with a maximum sensitivity at about 550 mµ and 610 mµ.

EXAMPLE 17.—3,3'-diethyl-9-methyl-4,5,4',5'-dibenzothiacarbocyanine bromide

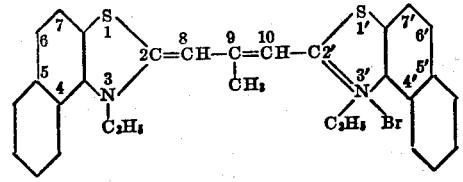

To 1.08 g. (1 mol.) of 2-(2-chloropropenyl)-naphtho [1,2] thiazole ethochloride and 2.00 g. (1.5 mols.) of 2-methylnaphtho [1,2] thiazole etho-p-toluenesulfonate in 10 c. c. of absolute ethyl alcohol there was added with stirring 0.70 g. (2.1 mols.) of triethylamine. Dye formation was rapid. The reaction mixture was warmed gently for about two minutes and then allowed to stand at room temperature for about 15 minutes. The warm reaction mixture was then treated with a hot solution of potassium bromide (1 g. in 15 c. c. of water). After chilling, the dye was collected on a filter, washed with water, stirred with hot acetone, the resulting suspension chilled, and the crystals filtered off and washed with acetone. The yield of dye was 32% crude and 16% after two recrystallizations from methyl alcohol (100 c. c. per gram of dye). The dark green crystals melted at 239-240° C. with decomposition. The dye sensitized a photographic silver bromide emulsion to 690 mµ with a maximum sensitivity at about 560 mµ and 660 mµ.

EXAMPLE 18.—2-[(1-ethyl-2(1)-naphtho[1,2] thiazolylidene) isopropylidene]-3(2)-thianaphthenone

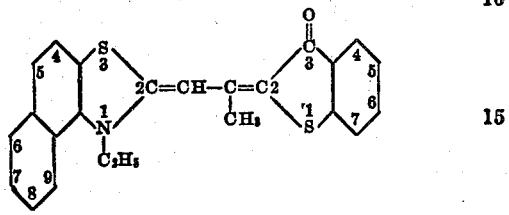

To 1.62 g. (1 mol.) of 2-(2-chloropropenyl)-naphtho[1,2]thiazole ethochloride and 0.97 g. (1 mol.) of thioindoxylic acid suspended in 15 c. c. of absolute ethyl alcohol there was added with shaking 1.06 g. (2.1 mols.) of triethylamine. The reaction mixture was heated at the refluxing temperature for about two minutes. Dye formation was very rapid. The dye was further precipitated by the addition of 100 c. c. of ethyl ether. After chilling the mixture, the product was collected on a filter and washed with methyl alcohol. The yield of dye was 20% crude and 3% after two recrystallizations from pyridine (50 c. c. per gram of dye). The red crystals melted above 310° C.

In addition to the examples illustrated in the foregoing, there was prepared by analogous processes 1', 9-diethyl-3-methyl-thia-4'-carbocyanine iodide, 1',3-diethyl-9-methyl-thia-4'-carbocyanine perchlorate, 2-[2-(1-piperidyl)-propenyl]-benzothiazole ethiodide, 2-[2-(4-morpholyl)-propenyl]-benzothiazole ethiodide, and 5-chloro-2-[2-(1-piperidyl)-propenyl]-benzothiazole ethiodide.

From these examples it is apparent that a large number of condensations are possible with our halogenovinyl compounds. Many of the products obtained from such condensations are dyes which are useful as coloring agents for textile materials, as dyes for light filters, and as sensitizers for photographic silver halide emulsions.

What we claim as our invention and desire to be secured by Letters Patent of the United States is:

1. Halogenovinyl compounds characterized by the following general formula:

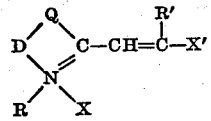

wherein D represents an organic group selected from the group consisting of phenylene and naphthylene groups, Q represents an atom selected from the group consisting of sulfur and selenium atoms, R represents an alkyl group, R' represents an organic group selected from the group consisting of alkyl and aryl groups, X represents an anion and X' represents a halogen atom.

2. Halogenovinyl compound characterized by the following general formula:

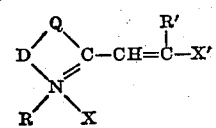

wherein D represents an organic group selected from the group consisting of phenylene and naphthalene groups, Q represents an atom selected from the group consisting of sulfur and selenium atoms, R represents an alkyl group, R' represents an organic group selected from the group consisting of alkyl and aryl groups, X represents a halide anion and X' represents a halogen atom.

3. Halogenovinyl compounds characterized by the following general formula:

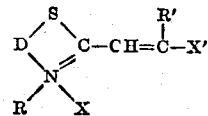

wherein D represents a phenylene group, R and R' each represent an alkyl group, X represents a halide anion and X' represents a halogen atom.

4. Halogenovinyl compounds characterized by the following general formula:

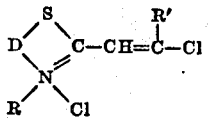

wherein D represents a phenylene group and R and R' each represent an alkyl group.

5. Halogenovinyl compounds characterized by the following general formula:

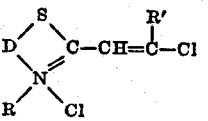

wherein D represents a phenylene group, R represents an alkyl group of the formula $C_nH_{2n+1}$ wherein $n$ represents a positive integer of from one to four and R' represents an alkyl group of the formula $C_nH_{2n+1}$ wherein $n$ represents a positive integer of from one to two.

6. 5-chloro-2-(2-chloropropenyl)-benzothiazole ethochloride.

7. Halogenovinyl compounds characterized by the following general formula:

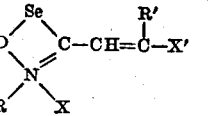

wherein D represents a phenylene group, R and R' each represent an alkyl group, X represents a halide anion and X' represents a halogen atom.

8. Halogenovinyl compounds characterized by the following general formula:

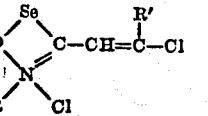

wherein D represents a phenylene group and R and R' each represent an alkyl group.

9. Halogenovinyl compounds characterized by the following general formula:

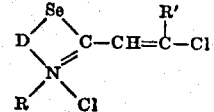

wherein D represents a phenylene group, R represents an alkyl group of the formula $C_nH_{2n+1}$ wherein $n$ represents a positive integer of from one to four and R' represents an alkyl group of the formula $C_nH_{2n+1}$ wherein $n$ represents a positive integer of from one to two.

10. 2-(2-bromopropenyl)-benzoselenazole ethobromide.

11. Halogenovinyl compounds characterized by the following general formula:

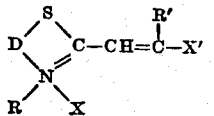

wherein D represents a naphthylene group, R and R' each represent an alkyl group, X represents a halide anion and X' represents a halogen atom.

12. Halogenovinyl compounds characterized by the following general formula:

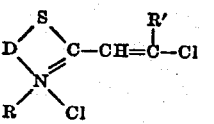

wherein D represents a naphthylene group and R and R' each represent alkyl groups.

13. Halogenovinyl compounds characterized by the following general formula:

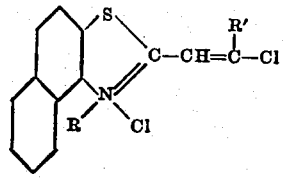

wherein R represents an alkyl group of the formula $C_nH_{2n+1}$ wherein $n$ represents a positive integer of from one to four and R' represents an alkyl group of the formula $C_nH_{2n+1}$ wherein $n$ represents a positive integer of from one to two.

14. 2-(2-chloropropenyl)-naphtho-[1,2]-thiazole ethochloride.

LESLIE G. S. BROOKER.
FRANK L. WHITE.